(12) United States Patent
Tan et al.

(10) Patent No.: US 12,406,285 B2
(45) Date of Patent: Sep. 2, 2025

(54) SYSTEM AND METHOD FOR AUTOMATICALLY GENERATING EMAIL AND ASSOCIATED EMAIL STRATEGIES

(71) Applicant: 6SENSE INSIGHTS, INC., San Francisco, CA (US)

(72) Inventors: Marcel Cheng Wei Tan, San Francisco, CA (US); Ken Jyi Lim, Singapore (SG); Edwin Khai Ern Chan, Singapore (SG); Yao Jie Lim, Singapore (SG); Zhuoyi Wu, Singapore (SG); James Christopher Keys, Singapore (SG); Gabriel Matthew Galupo Rodriguez, Singapore (SG); Vincent James Galupo Rodriguez, Singapore (SG); Yul Lee Kim, Singapore (SG); Jun Yu Tan, Singapore (SG)

(73) Assignee: 6SENSE INSIGHTS, INC., San Francisco, CA (US)

( * ) Notice: Subject to any disclaimer, the term of this patent is extended or adjusted under 35 U.S.C. 154(b) by 0 days.

(21) Appl. No.: 18/957,529

(22) Filed: Nov. 22, 2024

(65) Prior Publication Data

US 2025/0124471 A1 Apr. 17, 2025

Related U.S. Application Data

(63) Continuation of application No. PCT/IB2024/060079, filed on Oct. 15, 2024.

(30) Foreign Application Priority Data

Oct. 17, 2023 (SG) .......................... 10202302940X

(51) Int. Cl.
*G06Q 30/02* (2023.01)
*G06Q 10/107* (2023.01)
(Continued)

(52) U.S. Cl.
CPC ....... *G06Q 30/0271* (2013.01); *G06Q 10/107* (2013.01); *G06Q 30/0201* (2013.01)

(58) Field of Classification Search
CPC .......... G06Q 30/0271; G06Q 30/0201; G06Q 10/107
See application file for complete search history.

(56) References Cited

U.S. PATENT DOCUMENTS

2022/0180274 A1* 6/2022 Makhija ................. G06N 3/045
2022/0351252 A1* 11/2022 Gerber ............... G06Q 30/0205
2022/0405775 A1* 12/2022 Siebel ................ G06Q 30/0201

* cited by examiner

*Primary Examiner* — Scott C Anderson
(74) *Attorney, Agent, or Firm* — Procopio, Cory, Hargreaves & Savitch LLP

(57) ABSTRACT

A method for efficiently generating a plurality of personalized email strategies and corresponding personalized emails for campaign recipients is disclosed. Multi-dimensional data comprising account data, recipient data, and seller data is received from one or more data sources. The received multi-dimensional data is processed to extract relevant features. A dynamic feature hierarchy is generated using the extracted features. A pre-trained machine learning model is fine-tuned using the dynamic feature hierarchy to generate email strategies, wherein model parameters are adjusted based on the hierarchy during fine-tuning. A plurality of email strategies is generated for each recipient by applying the fine-tuned model's recommendations. An email strategy is selected from the plurality of strategies based on one or more factors. A personalized email corresponding to the selected email strategy is generated. The personalized email and the selected email strategy used to generate it are displayed to a user.

14 Claims, 10 Drawing Sheets

(51) Int. Cl.
*G06Q 30/0201* (2023.01)
*G06Q 30/0251* (2023.01)

FIG. 4

Campaigns

All campaigns / Revive unresponsive leads -- Sep 2023

Revive unresponsive leads -- Sep 2023 ✏ [Draft]

Last saved 2 minutes ago [Actions ⌄] [Save Draft]

Design AI conversation flow

○ 1 more step

Set up campaign emails and automate replies for different scenarios.

◉ Enable hyper-personalization
Introduction email cadence will be written using generative AI. You can configure AI replies in the conversation flow.

⚠ You have unpublished changes in this conversation flow    ✕
Newly-enrolled contacts will still receive the last published version of your conversation flow until you publish your latest changes.

ⓘ You have no email content
You can load on AI Writer email, or start writing from scratch.
[📄 Load saved email]  ✏ Start from scratch

FIG. 6A

○ Enable hyper-personalization

Introduction email cadence will be written using generative AI.
You can configure AI replies in the conversation flow.

1. Select a campaign playbook

Your campaign playbook guides your AI to write better emails.

Campaign playbook

| Select a campaign playbook | > |
|---|---|
| High-intent 6QA conversion | |
| Awaken the "dead" | |
| Conversational screen | Coming soon... |
| Peer-to-peer nurture | Coming soon... |
| Product cross-sell | Coming soon... |
| Out-of-bounds inbound | Coming soon... |
| Event follow-up | Coming soon... |

FIG. 6B

Campaigns

All campaigns / Revive unresponsive leads – Sep 2023

Revive unresponsive leads – Sep 2023  ✎  (Draft)

1. Select a campaign playbook
Your campaign playbook guides your AI to write better emails Campaign playbook (Awaken the "dead")

2. Select training content (optional)
Training content helps your AI provide accurate information to your contacts. Select up to 5 from your ⊙ knowledge No training content selected 3. Conversation settings
If a contact doesn't reply, send a follow up after [3˅] work days, upto a maximum of [3˅] total emails.

4. Configure AI replies
Write or automate replies for different scenarios.

✎ Customize AI conversation flow

⚠ You have unpublished changes in this conversation flow
Newly enrolled contacts will still receive the last published version of your conversation flow until you publish.

---

Select training content                                                     ✕

Select up to 5 pieces of training content.                    ⬆ Add training content ⊙ Custom Truck CE Story.pdf            ⊙ Conversational Email One-pager.pdf
  64.72 KB                                2.36 MB The information era is over. Welcome to  ⊙ Final Forrester Summit_Revenue AI One-p
The Age of Intelligence. Intelligence is    1.80 MB
different. It...

⊙ Marathon Health's Marketing Was 'Lonely...
  82.26 KB

Manage training content at your ⊙ Knowledge Base (Cancel)  (Save)

SYSTEM AND METHOD FOR AUTOMATICALLY GENERATING EMAIL AND ASSOCIATED EMAIL STRATEGIES

CROSS-REFERENCE TO RELATED APPLICATIONS

The present application is a bypass continuation of International Application No. PCT/IB2024/060079, filed on Oct. 15, 2024, which claims priority to Singaporean Patent Application No. 10202302940X, filed on Oct. 17, 2023, which are both hereby incorporated herein by reference as if set forth in full.

TECHNICAL FIELD

The present subject matter described herein, in general, relates to artificial intelligence (AI), and, more particularly, to automated generation of emails strategies and email using an AI model, such as a generative language model.

BACKGROUND

In the past few years, artificial intelligence (AI) has come a long way, changing many aspects of how people connect and talk to each other. The automated creation of textual material is an important area where AI has made important contributions. This has many uses in many different areas. This includes business communication, where it's important to make words that are compelling and relevant in ways other than sales and marketing.

In today's fast-paced digital world, everyone wants communication that is personalized, interesting, and relevant to the situation, no matter what company it is. It's clear that sales and marketing emails need to be successful, but other parts of a business, like customer service, internal communication, and strategic partnerships, also need well-thought-out content that can be generated automatically. Traditional ways of writing business emails by hand often fall short in terms of speed and customization, which shows how important it is to find new ways to do things.

Generative language models, a type of AI technology, are known for being able to write text that sounds like it was written by a person by looking at huge amounts of data and finding trends. These models have shown a lot of promise in automating different parts of content creation. As the need for automatic email creation grows in many business settings, the present aims to offer new approaches, methods, and systems that use AI models in the email creation process. This technology meets the changing needs of businesses and workers who want to use AI to communicate more efficiently and effectively in many areas of business, which leads to success and growth.

For example, in the context of running a large-scale email campaign targeting approximately 1000 email recipients, with each message customized based on the structure and type of the recipient company, several technical challenges arise. The primary difficulty lies in efficiently generating and personalizing a high volume of emails while maintaining relevance and quality for each recipient. Traditional methods often struggle with scalability, as manually crafting individualized content for such a large number of recipients is time-consuming and prone to human error. Additionally, ensuring that each email accurately reflects the specific characteristics of the target company requires access to and processing of vast amounts of data, which can be computationally intensive and logistically complex.

Current systems often fall short in addressing these challenges effectively. Many existing solutions rely on basic mail merge techniques or rudimentary templating systems that offer limited customization options. These approaches frequently result in generic, one-size-fits-all content that fails to resonate with recipients on a personal level. Furthermore, existing systems lack the sophistication to analyse and incorporate complex company data in real-time, leading to outdated or irrelevant messaging. The inability to dynamically adapt content based on nuanced company characteristics can significantly reduce the effectiveness of the email campaign, potentially damaging sender reputation and decreasing overall engagement rates.

Additionally, in the field of personalized email generation, the core technical problem lies in the inefficiency of traditional systems when it comes to processing large volumes of multi-dimensional data that includes recipient behaviour, account information, and seller data. Existing systems face bottlenecks in efficiently extracting relevant features from this data, dynamically adapting to changing recipient behaviours, and using machine learning models to generate personalized email strategies. These inefficiencies result in slower processing times, suboptimal email strategies, and a lack of scalability, making it difficult to meet the demand for accurate and timely personalized email content.

Current solutions for personalized email generation rely on static machine learning models and pre-configured templates, which fail to handle real-time updates in recipient behaviour and data. These systems typically use rigid data pre-processing methods that do not dynamically adapt to new data inputs or account for changes in recipient interactions. Furthermore, feature extraction and ranking methods are often predefined, and models are not fine-tuned on a continuous basis. As a result, existing systems are limited in their ability to generate personalized email strategies that accurately reflect the latest recipient behaviour. Moreover, these systems often require significant manual intervention to process data and tune models, further increasing inefficiency and processing delays.

The shortcomings of current systems are primarily due to their inability to dynamically process multi-dimensional data and efficiently adjust machine learning models in real time. This results in a technical bottleneck in the email personalization process, where relevant features are either missed or not properly weighted, leading to ineffective email strategies. Additionally, the lack of automation in pre-processing, feature extraction, and model tuning significantly increases computational load and processing time. There is a clear need for a processor-driven system that automates these steps, reducing the processing bottlenecks by improving data handling, dynamically ranking features, and fine-tuning models continuously. Such a system would address the inefficiencies in existing methods, making the generation of personalized email strategies faster, more accurate, and highly adaptive to real-time data changes.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for automatically generating an email and associated email strategy. This summary is not intended to identify essential features of the claimed subject matter nor is it intended for use in determining or limiting the scope of the claimed subject matter.

In one implementation, a method for efficiently generating a plurality of personalized email strategies and a corresponding personalized email for each recipient of a campaign is disclosed. Multi-dimensional data comprising account data, recipient data, and seller data is received from one or more data sources. The received multi-dimensional data is processed via a processing module to extract one or more features. A dynamic feature hierarchy is generated based on the one or more extracted features by executing a feature ranking module. The dynamic feature hierarchy is generated by executing the feature ranking module to automatically evaluate and rank the one or more features, wherein correlation coefficients are computed using a correlation analysis algorithm calculating relationships between the one or more features and a desired outcome, and correlation values are stored in the system memory. Feature importance scores are assigned by executing a machine learning model on the processor. The dynamic feature hierarchy is updated in real-time based on interaction data collected from the transmitted emails and received recipient responses, with the updates being executed automatically by the processor via a feedback loop module. A pre-trained machine learning model is fine-tuned using the dynamic feature hierarchy, wherein one or more model parameters are adjusted by executing a model tuning module, with the fine-tuning being performed based on the importance of the one or more features in the dynamic feature hierarchy. A plurality of email strategies for each recipient of the campaign is generated using the fine-tuned model, wherein the fine-tuned model is applied to generate personalized content, timing, and format recommendations for the email strategy based on the extracted features and ranked importance. An email strategy is selected from the plurality of email strategies based on one or more factors, wherein a strategy selection algorithm is executed that scores and ranks the email strategies based on engagement potential, relevance, outreach appropriateness, and saliency, and the highest-ranked strategy is automatically selected. A personalized email corresponding to the selected email strategy is generated. The personalized email is sent to the recipient of the campaign, and recipient interactions with the email are monitored in real-time, wherein the interaction data is used to further refine the dynamic feature hierarchy and fine-tune the machine learning model for subsequent email strategies.

In another implementation, a system for efficiently generating a plurality of personalized email strategies and corresponding personalized emails for campaign recipients is disclosed. The system comprising at least a memory to store one or more instructions and at a processor is communicatively coupled to the memory. The processor upon execution of the stored instructions is configured to receive multi-dimensional data comprising account data, recipient data, and seller data, from one or more data sources. The received multi-dimensional data is processed via a processing module to extract one or more features. A dynamic feature hierarchy is generated based on the one or more extracted features by executing a feature ranking module. The dynamic feature hierarchy is generated by executing the feature ranking module to automatically evaluate and rank the one or more features, wherein correlation coefficients are computed using a correlation analysis algorithm calculating relationships between the one or more features and a desired outcome, and correlation values are stored in the system memory. Feature importance scores are assigned by executing a machine learning model on the processor. The dynamic feature hierarchy is updated in real-time based on interaction data collected from the transmitted emails and received recipient responses, with the updates being executed automatically by the processor via a feedback loop module. A pre-trained machine learning model is fine-tuned using the dynamic feature hierarchy, wherein one or more model parameters are adjusted by executing a model tuning module, with the fine-tuning being performed based on the importance of the one or more features in the dynamic feature hierarchy. A plurality of email strategies for each recipient of the campaign is generated using the fine-tuned model, wherein the fine-tuned model is applied to generate personalized content, timing, and format recommendations for the email strategy based on the extracted features and ranked importance. An email strategy is selected from the plurality of email strategies based on one or more factors, wherein a strategy selection algorithm is executed that scores and ranks the email strategies based on engagement potential, relevance, outreach appropriateness, and saliency, and the highest-ranked strategy is automatically selected. A personalized email corresponding to the selected email strategy is generated. The personalized email is sent to the recipient of the campaign, and recipient interactions with the email are monitored in real-time, wherein the interaction data is used to further refine the dynamic feature hierarchy and fine-tune the machine learning model for subsequent email strategies.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for automatically generating an email and associated email strategy disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

FIG. 4 illustrates another example of a graphical user interface representing email strategies associated with specific citations from emails, in accordance with an embodiment of the present subject matter.

FIGS. 6A, 6B, 6C, and 6D illustrates an example of a graphical user interface for setting up the hyper-personalization, in accordance with an embodiment of the present subject matter.

Figure 1:
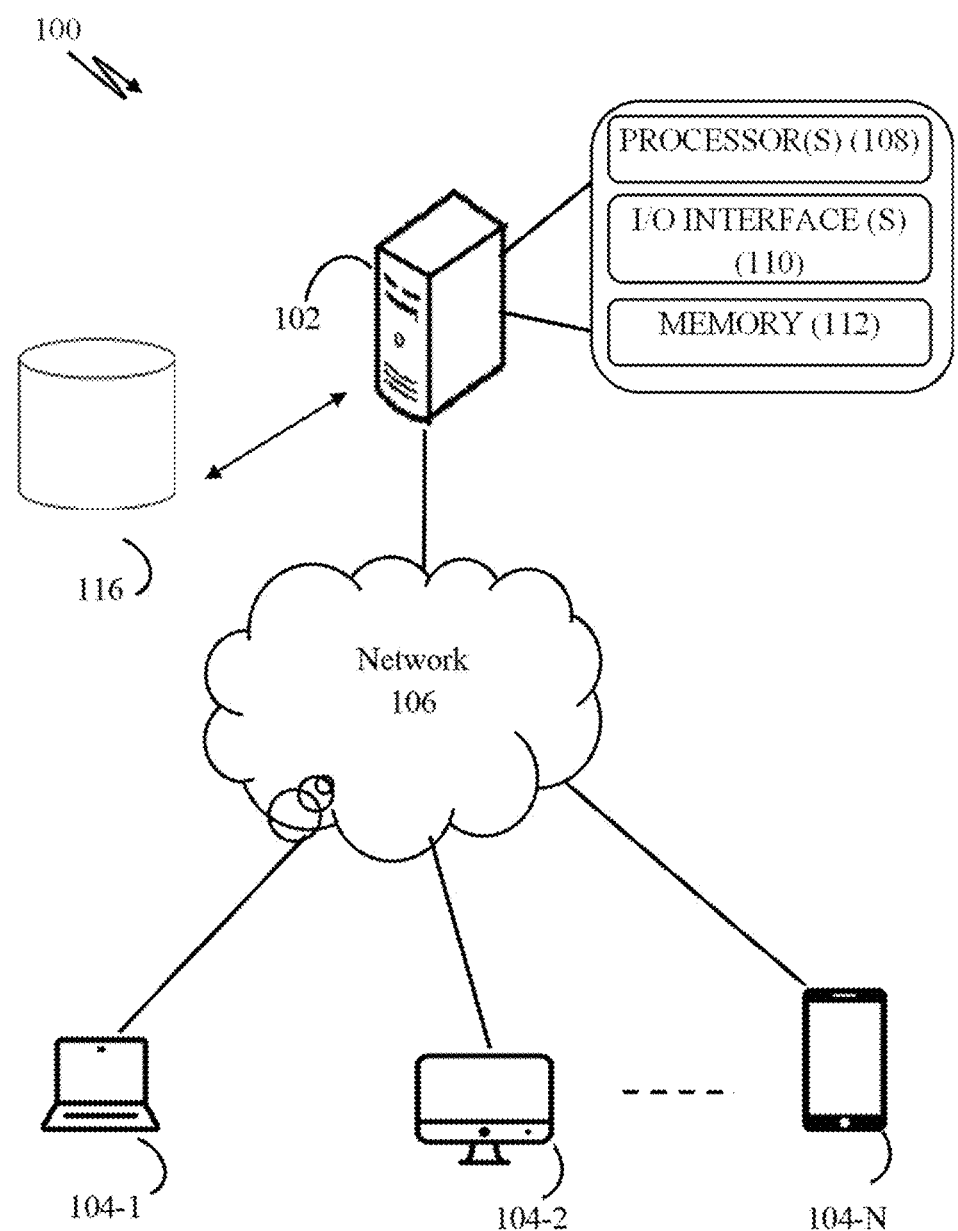
FIG. 1 illustrates a network implementation for generating a plurality of personalized email strategies and a corresponding personalized email, in accordance with an embodiment of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "generating," "processing," "training," "identifying," "alerting," "selecting", "transmitting", "receiving", "extracting", and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a method and a system for efficiently generating a plurality of personalized email strategies and corresponding personalized emails for each recipient of a campaign. The term 'campaign' may refer to a coordinated series of email communications directed to a large number of recipients, typically numbering in the thousands or millions. The term 'recipient' and 'prospect' may be used interchangeably in the below disclosure. A campaign may be designed to achieve specific marketing, sales, or communication objectives and may involve sending personalized messages to diverse groups of recipients over a defined period of time. Campaigns may include, but are not limited to, product launches, customer re-engagement efforts, lead nurturing sequences, event promotions, seasonal promotions, brand awareness initiatives, or any other large-scale, purpose-driven email outreach effort. The present system addresses a common and time-consuming challenge faced by users (or Business Development Representatives (BDRs)) when drafting personalized emails for leads or recipients. Traditional email composition can be a laborious process, often consuming time for an email. The system's innovative approach not only streamlines this process but also ensures a higher degree of personalization. BDRs spend a lot of time on recipient's research before even beginning to draft an email. This research phase involves delving into various data sources, such as the recipients' LinkedIn™ profile, Salesforce™ activity, company's website.

The proposed system overcomes these challenges through a sophisticated, multi-faceted approach that leverages advanced machine learning techniques and real-time data processing. By implementing a dynamic feature hierarchy and continuously fine-tuning the machine learning model, the system efficiently handles large-scale email campaigns while maintaining high levels of personalization and relevance. The system addresses the scalability issue by automating the process of generating personalized content for each recipient. Instead of relying on manual crafting or basic templating, it utilizes a fine-tuned machine learning model that can rapidly generate tailored email strategies for thousands of recipients. This approach significantly reduces the time and human error associated with large-scale campaigns. To tackle the challenge of processing vast amounts of data, the system employs advanced data processing techniques. It efficiently extracts relevant features from multi-dimensional data sources, including account data, recipient data, and seller data. The dynamic feature hierarchy allows the system to prioritize the most important characteristics for each recipient, ensuring that emails accurately reflect specific company attributes without becoming computationally overwhelming. Unlike existing solutions that use static templates or basic mail merge techniques, this system adapts in real-time to changing recipient behaviours and data. The continuous updating of the dynamic feature hierarchy and fine-tuning of the machine learning model allows for the incorporation of the latest recipient interactions and company data, ensuring that content remains relevant and up to date. The system's ability to analyse and incorporate complex company data in real-time addresses the shortcoming of outdated or irrelevant messaging. By using correlation analysis and machine learning to rank features and generate personalized content, the system can create highly targeted emails that resonate with recipients on a personal level. Furthermore, the automated strategy selection process, which considers factors such as engagement potential, relevance, outreach appropriateness, and saliency, ensures that each email is optimized for maximum effectiveness. This approach significantly reduces the risk of damaging sender reputation or decreasing engagement rates. By automating and optimizing each step of the email personalization process-from data processing and feature extraction to model fine-tuning and strategy selection-the system effectively eliminates the bottlenecks and inefficiencies present in traditional methods. This results in faster processing times, more accurate email strategies, and improved scalability, meeting the demand for timely and personalized email content even in large-scale campaigns. In summary, the proposed system offers a comprehensive solution to the technical challenges of large-scale, personalized email campaigns. Its dynamic, data-driven approach enables efficient processing of complex data, real-time adaptation to recipient behaviour, and the generation of highly personalized email strategies at scale, overcoming the limitations of current systems and significantly improving the effectiveness of email marketing campaigns.

Referring now to FIG. 1, a network implementation 100 of a system 102 for automatically generating an email and associated email strategy is disclosed. Initially, the system 102 receives recipient data. In an example, the software may be installed on a user device 104-1. It may be noted that the one or more users may access the system 102 through one or more user devices 104-2, 104-3 . . . 104-N, collectively referred to as user devices 104, hereinafter, or applications residing on the user devices 104. The system 102 receive user data from one or more user devices 104. Further, the system may also 102 receive feedback from a user using the user devices 104.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be accessed by multiple users through one or more user devices 104-1, 104-3 . . . 104-N. In one implementation, the system 102 may comprise the cloud-based computing environment in which the user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

As there are various challenges observed in the existing art, the challenges necessitate the need to build the system 102 for generating a plurality of email strategies and a corresponding email. At first, a user may use the user device 104 to access the system 102 via the I/O interface 110. The user may register the user devices 104 using the I/O interface 110 in order to use the system 102. In one aspect, the user may access the I/O interface 110 of the system 102. The detail functioning of the system 102 is described below with the help of figures.

The present subject matter describes the system 102 for efficiently generating a plurality of personalized email strategies and corresponding personalized email. The system 102 may receive multidimensional data. The multidimensional data may refer to data that has multiple attributes or characteristics, coming from various sources and representing different aspects of the entities involved in the email campaign. For example, the multidimensional data may comprise seller data (vendor data), recipient data (or person data), and account data (or company data). By having access to this diverse information, the system can generate more accurate, tailored email strategies because the system may understand various aspects of the recipient's behavior, preferences, and interaction history. For example, if the system only has email interaction data (like open rates), the system may predict engagement, but the system won't understand the recipient's purchase behavior or sentiment, which could significantly improve the relevance of the email.

In an embodiment, the seller data may comprise a seller name, seller description, and a seller website. In an embodiment, the seller data may include a comprehensive product or service catalogue, including detailed descriptions, pricing information, and unique features or benefits of each offering. In yet another embodiment, the seller data may include case studies and success stories that demonstrate the tangible benefits of the seller's products or services to previous clients, providing valuable social proof. In yet another embodiment, industry certifications, awards, and other professional recognitions may be included to establish the seller's credibility and expertise in their field. In an embodiment, the seller data may include information about key team members, their roles, and areas of expertise may be utilized to personalize email signatures or add depth to outreach efforts. In another embodiment, the seller data may include the seller's company history, significant milestones, and strategic partnerships or integrations, offering additional context and highlighting the breadth of the seller's capabilities. In yet another embodiment the seller data may include valuable content assets such as whitepapers, e-books, or webinars, as well as customer testimonials, social media profiles, and recent press releases or media mentions. By leveraging this expanded set of seller data, the system may be able to generate more comprehensive, compelling, and contextually relevant email content, effectively showcasing the seller's unique value proposition and industry standing to potential clients.

In an embodiment, the recipient data may comprise email id, recipient interests, job title, seniority, job function, recent online activity of the recipient, and website behavior of the recipient. In yet another embodiment, the recipient data may include professional background information, such as educational qualifications, certifications, and previous work experiences, which can provide insights into the recipient's expertise and career trajectory. In an embodiment, the recipient data may include data on the recipient's professional achievements, publications, or speaking engagements, offering a more comprehensive view of their industry influence and thought leadership. In some cases, the recipient data may include information on the recipient's participation in industry events, webinars, or conferences, indicating their level of engagement within their professional community. In some aspect, the recipient data may include data on the recipient's professional network connections and interactions, which can provide valuable context for personalized outreach. In an embodiment, the recipient data may include data on the recipient's preferred communication channels and times, based on their past interactions with digital content or email campaigns. This can help optimize the timing and method of outreach for maximum engagement. In an embodiment, the recipient data may include information on the recipient' role in decision-making processes within their organization, such as whether they are a key influencer, decision-maker, or part of a larger buying committee. This can be crucial for tailoring the content and approach of generated emails. Additionally, the recipient data may include data on the recipient's content consumption patterns, such as preferred formats (e.g., video, text, infographics) or topics of interest, to further refine the personalization of generated emails.

Further, the account data may comprise account description, industry, employee range, revenue range, technographics, psychographics, and Prospect Conversion Probability (PCP) or account's temperature. For example, the account data may correspond to information of a company or organization to which the recipient of the emails is associated. In an embodiment, the account data may include organizational structure information, detailing key departments, decision-making hierarchies, and reporting relationships within the account. This may help in identifying relevant stakeholders for targeted outreach. In yet another embedment the account data may indicate, the account's growth trajectory, including recent expansions, mergers, or acquisitions, may be incorporated to provide context on the company's current state and future direction. In yet another embodiment, the account data may include financial data such as profit margins, investment history, and spending patterns in relevant product or service categories. This information can offer insights into the account's purchasing capacity and priorities. In an embodiment the account's competitive landscape, including main rivals and market positioning, may be part of the data set, allowing for more strategic communication approaches. In yet another embodiment, the account data may include information on the account's current vendor relationships and contract renewal dates for relevant services may be included, potentially identifying opportune times for outreach. In an embodiment, the account's compliance requirements, industry regulations, and known pain points or challenges may also be part of the data set, enabling more targeted and relevant messaging. In an embodiment the account data may include the account's innovation history, including patents, research and development focus areas, or new product launches, may provide valuable context for tailoring value propositions. In an embodiment, any recent news, press releases, or significant company announcements may be incorporated, ensuring that generated emails can reference timely and relevant information about the account. This comprehensive account data enables the system to generate highly targeted and contextually appropriate email content, taking into account the full scope of the account's profile and current situation.

The system receives the seller's data and leverages the data to inform the AI regarding the specific recipient for whom the email content is being generated. The seller data is used for directing the AI model to tailor its messaging with precision according to the designated company or organization. Furthermore, the system integrates the seller's description to provide the AI with essential insights into the nature and core activities of the company in question. This contextual information equips the AI with the necessary knowledge to craft emails that seamlessly align with the company's objectives and resonate effectively with the intended audience. Furthermore, the system incorporates the seller's website data to supply the AI model with the relevant URL of the company. The URL may be included within the generated emails, enhancing the informativeness and contextual relevance of the email content.

The recipient data is useful for determining information related to the recipient. For example, the email address informs the AI model to send the email to the designated recipient of the email. Further, the email id is also used for extracting information from Sales Intelligence (SI), Customer Relationship Management (CRM), or Customer Engagement (CE) data sources. Furthermore, the email id contributes to the personalization of introduction statements by establishing a direct connection to the recipient. Elements such as job title, seniority, job function, and recent activities helps to determine the persona and context of the recipient. This, in turn, influences the nature of the questions, value propositions, and nomenclature employed in the email outreach. Recent activities, sourced from SI, serve as cues for personalizing the opening and follow-up lines in the email, recognizing and acknowledging the recipient's interactions with the seller's company. Additionally, web crawling data, obtained through SI and CE sources, offers insights into the recipient's most recent online activities, enabling further refinement of email personalization, all of which contribute to more effective and engaging communication.

In another embodiment, the system may receive the account data as an input. The account data is useful in understanding a recipient's company and tailoring the outreach to the account's specific needs. Account description aids in comprehending the nature of the recipient's company and identifies the product line most relevant to the account. Industry data determines the selection of logos and case studies used as social proof, further enhancing the appeal of the seller's offerings. Employee and revenue range of the account contribute to classifying the company stage, which, in turn, influences the value propositions and case studies emphasized in the outreach.

Technographics data assists in identifying the technologies employed by the account and their relevance to internal products, guiding the framing of customer questions and problem-solving approaches. The term "technographics," as used hereinafter, is a combination of the word "technology" and "demographics." Simply put, technographic data is defined as information regarding the various technologies used by a recipient or people over a period of time. Based on the technographic data of the recipient, insights may be drawn that help businesses identify recipient that are most likely to convert based on the knowledge of the current technology stack. In other words, technographic data helps to understand the technology and tools used by recipient.

The technographic data may also include information such as the date from which a recipient started using a particular technology (e.g., software) and in which company the recipient was employed at that time. Thus, helping the marketing team or sales team to effectively market to the recipient's that are most likely to convert based on their current technology stack.

Psychographics, sourced from SI, offer insights into the topics of interest and conversation within the account, aligning product descriptions and value propositions with themes that are pertinent to the recipients. Lastly, the Prospect Conversion Probability (PCP) data provides valuable intelligence on the account's likelihood to purchase the seller's product, a critical determinant in the approach the AI's email will adopt, whether it leans towards a more assertive pursuit of a meeting or a more nurturing contact strategy. Overall, account data optimizes the efficacy of email outreach by tailoring it to the unique characteristics and needs of each recipient and their respective organizations.

It may be noted that system may be communicatively coupled to a database 116. In an embodiment, the database may reside on the system 102. In yet another embodiment, the database may reside out of the system 102. The database may pre-store data related to one or more accounts or organization which are considered to be a potential recipient. For example, the database may store at least one of the recipient data, account data, or the vendor/seller data as discussed above.

In an embodiment the system may receive the data from various sources in JSON format. The data may include seller data, account data, and recipient data. JSON is a structured and easily machine-readable format, making it suitable for data exchange. The received JSON data is ingested into the system, making it available for further processing. Further, the system may initiate data cleaning process. The received data is cleaned by data cleaning techniques to ensure its accuracy, consistency, and quality.

In an embodiment, the received data is used for understanding and engaging with recipients and accounts in a marketing or sales context. The received data serve as valuable pieces of information that can be harnessed to create highly targeted and effective email communication or any sort of communication strategies. The key to this hierarchy is its adaptability, where data inputs can be skipped if they are not applicable or unavailable for a specific contact or account.

In an embodiment, the system may be configured to initiate processing of the received multi-dimensional data through a dedicated data processing module. This module, executed by the processor, performs a series of operations to clean, standardize, and prepare the data for subsequent analysis and feature extraction. For example, initially, the processing module may scan the received data for any missing or null values. The processing module may employ intelligent imputation techniques to fill in these gaps, such as using mean values for numerical data or most frequent categories for categorical data. In cases where imputation is not feasible, the system may flag or remove the incomplete records, depending on the predefined data quality thresholds. In an embodiment, the processing module may identify outliers in the numerical data. For example, the module may use statistical methods like z-score or interquartile range to detect anomalous values. Depending on the nature of the outliers, the system may cap them at certain percentiles, transform them using techniques like logarithmic scaling, or remove them entirely if they are deemed erroneous. The processing module may then standardize the format of various data fields. This includes normalizing date formats, converting all text to lowercase, and ensuring consistent units for numerical values. For textual data, the system may perform additional cleaning steps such as removing special characters, stripping extra whitespace, and correcting common spelling errors. In an embodiment, to handle categorical variables, the processing module may encode them into a format suitable for machine learning algorithms. This may involve techniques like one-hot encoding for nominal categories or ordinal encoding for variables with a natural order. The system carefully considers the cardinality of each categorical variable to choose the most appropriate encoding method. In an embodiment, the processing module may identify and removes duplicate records, ensuring that each unique entity (user or account) is represented only once in the dataset. In cases of conflicting information for the same entity, the system applies predefined resolution rules, such as keeping the most recent data or aggregating multiple entries. In yet another embodiment, the processing module may perform feature scaling to ensure that all numerical variables are on a similar scale. This could involve techniques like min-max scaling or standardization (z-score normalization), depending on the distribution of the data and the requirements of the subsequent machine learning algorithms. In an embodiment, the system may maintain detailed logs of all pre-processing steps applied to the data. This ensures transparency and traceability, allowing for easy auditing and refinement of the pre-processing pipeline as needed. The resulting clean, standardized, and properly formatted data is then passed on to the feature extraction stage, providing a solid foundation for generating effective personalized email strategies.

In an embodiment, after the processing of the multi-dimensional data, the system may be configured to extract the one or more relevant features. The extraction of one or more features from the pre-processed data comprises multiple processes designed to capture comprehensive insights about recipient behaviour and preferences. In one aspect, engagement metrics are identified from the pre-processed data, by the system. These metrics include, but are not limited to, email open rates, click-through rates, and purchase behaviour. The system analyses historical email campaign data to calculate average open rates for each recipient, tracking changes over time to identify trends or shifts in engagement levels. Click-through rates are computed by examining the frequency and pattern of link interactions within previous emails, providing insights into the types of content that resonate most with each recipient. Purchase behaviour is analysed by integrating data from e-commerce platforms or CRM systems, allowing the system to identify not only if a purchase was made, but also details such as product categories, transaction values, and the time elapsed between email engagement and purchase actions.

In another aspect, temporal data is analysed to determine recipient activity patterns, including time of day and frequency of interactions. The system processes timestamp data associated with email opens, clicks, and other interactions to build a temporal profile for each recipient. This profile includes preferred times of day for email engagement, which are determined by clustering interaction times and identifying peak periods. The frequency of interactions is calculated by analysing the time intervals between successive engagements, allowing the system to identify patterns such as daily, weekly, or monthly engagement cycles.

Additionally, the system tracks changes in these temporal patterns over time, enabling it to adapt to evolving recipient behaviours.

In a further aspect, natural language processing (NLP) may be performed on textual data, including feedback and recipient-generated content, to derive sentiment scores. The system employs advanced NLP algorithms to analyse various sources of textual data, such as email replies, customer support interactions, social media posts, and product reviews. Sentiment analysis is conducted on this text to categorize the emotional tone as positive, negative, or neutral. The system goes beyond basic sentiment classification by employing aspect-based sentiment analysis, which identifies specific aspects or features mentioned in the text and the associated sentiment. This granular approach allows for a nuanced understanding of recipient attitudes towards different product features, service aspects, or communication styles. In an embodiment, the sentiment scores derived from the NLP analysis are quantified on a numerical scale, allowing for trend analysis over time and comparison across different segments of recipients. The system also identifies key phrases and topics that frequently occur in positive or negative contexts, providing valuable insights for content creation and personalization.

In an embodiment, the system combines these extracted features—engagement metrics, temporal patterns, and sentiment scores—to create a multi-dimensional profile for each recipient. This profile is continuously updated as new data becomes available, ensuring that the email strategy generation process always has access to the most current and relevant information about recipient preferences and behaviours. By extracting and analysing these diverse features, the system enables the creation of highly targeted and personalized email strategies that are optimized for individual recipient engagement patterns, preferences, and sentiments. This comprehensive approach significantly enhances the relevance and effectiveness of email communications, leading to improved engagement rates and overall campaign performance.

In an embodiment, the system is configured to generate a dynamic feature hierarchy based on the one more extracted feature, such that the hierarchy prioritizes different types of data based on their perceived value in personalizing communications. In an embodiment, the system may execute a feature ranking module to generate the dynamic feature hierarchy. The feature ranking module may automatically evaluate and rank the one or more features related to email generation and strategy selection. This process may involve several steps performed by the processor in conjunction with the system memory. For example, the system may identify relevant one or more features from the available multidimensional data that may potentially influence the desired outcome of email campaigns. These features may include, but are not limited to, recipient characteristics (e.g., job title, industry, company size), email content attributes (e.g., subject line length, personalization level, use of specific keywords), timing factors (e.g., day of week, time of day), and historical engagement metrics (e.g., open rates, click-through rates, response rates). The processor may then employ a correlation analysis algorithm to calculate correlation coefficients between each identified feature and the desired outcome. The desired outcome may be a specific metric such as response rate, conversion rate, or a composite score representing overall email effectiveness. The correlation analysis may utilize various methods depending on the nature of the data, such as Pearson correlation for linear relationships, Spearman rank correlation for monotonic relationships, or point-biserial correlation for dichotomous variables.

In an embodiment, for each extracted feature, the processor may compute a correlation coefficient that quantifies the strength and direction of its relationship with the desired outcome. These coefficients may range from −1 to 1, with values closer to the extremes indicating stronger correlations. The system may also calculate associated p-values or confidence intervals to assess the statistical significance of the correlations. Based on the computed correlation coefficients, the system may rank the features in order of their importance or relevance to the desired outcome. This ranking process may involve one or more of: sorting features based on the absolute value of their correlation coefficients, potentially applying a threshold to identify features with significant correlations or using statistical tests to determine the significance of correlations. The system may store the computed correlation values and rankings in the system memory for future reference and analysis. The system may be configured to store not only the correlation coefficients for each feature but also metadata about the analysis, such as the time of computation, the specific algorithm used, and any relevant contextual information. To account for the dynamic nature of email campaigns and changing recipient behaviours, the feature ranking process may be performed iteratively. The system may update the rankings as new data becomes available or as the desired outcome changes, allowing for continuous refinement of the feature importance assessment. The feature ranking module may also generate visualizations of the feature rankings, such as correlation heatmaps, scatter plots, or bar charts, to aid in interpretation and decision-making. These visualizations may be displayed to users through a graphical user interface, allowing for intuitive understanding of feature importance. By automatically evaluating and ranking features in this manner, the system can identify the most influential factors affecting email campaign performance. This information may then be used to guide the email generation process, inform strategy selection, and enable more targeted and effective optimization of email campaigns. For example, if the system identifies that emails sent on Tuesdays have a significantly higher response rate, the system may prioritize this feature when scheduling future email sends. Similarly, if certain types of subject lines or content structures show strong positive correlations with desired outcomes, the system may emphasize these elements in the email generation process.

In an embodiment, the system may assign feature importance scores to the one or more extracted features by executing a machine learning model on the processor. This process may involve several steps to evaluate and quantify the impact of various extracted features on email performance. For example, the machine learning model employed for this task may be a supervised learning algorithm, such as a random forest, gradient boosting machine, or neural network. The model may be trained on historical email campaign data, including features extracted from email content, recipient information, and engagement metrics. The training process may involve feeding the model with labelled data, where the labels represent the desired outcomes (e.g., email opens, clicks, or conversions). In an embodiment, during the execution of the machine learning model, the processor may perform feature importance analysis. The analysis may involve techniques such as permutation importance, where the values of a single feature are randomly shuffled and the impact on the model's performance is measured. Alternatively, the system may use built-in feature importance measures specific to the chosen algorithm, such as Gini importance for decision tree-based models or weight magnitudes for neural networks. The output of this process may be a set of numerical scores assigned to each feature, representing their relative importance in predicting the desired outcome. These scores may be normalized to a scale of 0 to 1 or expressed as percentages, allowing for easy comparison and interpretation. In addition to overall importance scores, the system may also compute feature importance for different segments or contexts. For example, the system may calculate separate importance scores for different industries, company sizes, or recipient roles, providing a more nuanced understanding of feature relevance across various scenarios. The feature importance scores may be stored in the system memory and may be used to inform various aspects of the email generation and strategy selection processes. For instance, features with higher importance scores may be given more weight in decision-making algorithms or may be prioritized in the email content generation process. In an embodiment, the system may update the dynamic feature hierarchy in real-time based on interaction data collected from previously transmitted emails and received recipient responses. For example, this updating process may be executed automatically by the processor via a feedback loop module, ensuring that the system continuously adapts to changing patterns and preferences in email engagement. The feedback loop module may operate by continuously monitoring and collecting data from sent emails and recipient interactions. This data may include metrics such as open rates, click-through rates, response rates, and conversion rates, as well as more detailed interaction data such as time spent reading the email, scroll depth, or specific links clicked. In an example, as new interaction data is received, the processor may execute real-time updates to the feature hierarchy. This process may involve several steps like, 1. data preprocessing: the incoming interaction data may be cleaned, normalized, and transformed into a format suitable for analysis. 2. feature extraction: the system may extract relevant features from the new data, potentially identifying new features that emerge from evolving patterns of interaction. 3. incremental learning: the machine learning model used for feature importance scoring may be updated incrementally with the new data, allowing it to adapt to changing patterns without requiring a full retraining. 4. score recalculation: based on the updated model, the system may recalculate feature importance scores, potentially resulting in changes to the feature hierarchy. 5. hierarchy update: the dynamic feature hierarchy may be reorganized based on the new importance scores, with features moving up or down in importance as dictated by the latest data. In an embodiment, the updated feature hierarchy may be immediately reflected in subsequent email generations and strategy selections, allowing the system to adapt its approach in real-time based on the most current interaction data. By implementing this dynamic, real-time updating process, the system may continuously refine the understanding of what features are most important for email effectiveness, adapting to changing recipient preferences, market conditions, or other factors that may influence email engagement over time.

It may be noted that the hierarchy serves as a guiding framework for optimizing communication strategies. It allows organizations to make the most of the information at their disposal, adapt to the individual characteristics of their audience, and maintain a dynamic and relevant approach to engaging recipients and accounts.

Training a Machine Learning Model

Further, a machine-learning model is trained using training dataset. The machine-learning model may be a generative language model. The model training may start with a pretrained generative language model, such as the Generative Pre-trained Transformer (GPT). GPT-4 is the fourth-generation language prediction model in the GPT-n series, created by OpenAI™ of San Francisco, California. GPT-4 is an autoregressive language model that uses deep learning to produce human-like text. GPT-4 has been pre-trained on a vast amount of text from the open Internet. This training dataset is used to fine-tune the pre-trained generative language model. Fine-tuning improves on the few-shot learning (FSL) capabilities of GPT-4 by allowing the model to be trained on many more examples than can reasonably fit in a prompt. This enables the model to achieve better results on a wider variety of outputs. While GPT-4 is used as an example, it should be understood that the machine-learning model may be any generative language model or other generative artificial intelligence (AI) model, including past and future generations of GPT, as well as other large language models. In an embodiment, the training process may also incorporate domain-specific data, such as industry reports, successful email campaigns, and sales communication best practices, to enhance the model's understanding of effective business communication strategies.

In an embodiment, the system may fine tune a pre-trained machine learning model based on the dynamic feature hierarchy to generate one or more email strategies. The pre-trained language model, like GPT, is further trained using the dataset of the hierarchy. The model's parameters are adjusted during this process to improve its understanding of the unique contexts and characteristics associated with the recipients. It may be noted that the fine-tuning helps the model better understand and respond to the nuances of the seller, recipient, and account data. In an embodiment, the fine-tuning process may be executed by a model tuning module, which adjusts one or more model parameters based on the importance of the features as determined by the dynamic feature hierarchy. The pre-trained machine learning model may be a large language model, such as GPT, or another type of model suitable for email generation and strategy selection. This model may have been initially trained on a broad corpus of text data, providing it with general language understanding and generation capabilities.

n an embodiment, the system fine-tunes a pre-trained machine learning model using the dynamic feature hierarchy. This fine-tuning process is executed by a model tuning module, which adjusts various model parameters based on the importance of the one or more features in the dynamic feature hierarchy. In one aspect, the model tuning module employs an iterative approach to adjust the learning rates of the machine learning model. The learning rates are dynamically modified based on the importance scores of features in the hierarchy. For features with higher importance scores, the learning rate may be increased to allow the model to adapt more quickly to these critical features. Conversely, for less important features, the learning rate may be decreased to prevent overfitting on less relevant data. This adaptive learning rate adjustment ensures that the model remains responsive to the most significant features while maintaining stability. In another aspect, the model tuning module adjusts regularization parameters to optimize the model's performance. The regularization strength is modulated based on the complexity and importance of different feature sets within the hierarchy. For highly important features, regularization may be relaxed to allow the model to capture more nuanced patterns. For less critical features, stronger regularization may be applied to prevent overfitting and improve generalization. The system may employ techniques such as L1 (Lasso) or L2 (Ridge) regularization, with the specific type and strength determined by the characteristics of the feature set and its position in the hierarchy. In a further aspect, feature weighting is dynamically adjusted by the model tuning module. The weights assigned to different features are recalibrated based on their positions and importance scores in the dynamic feature hierarchy. Features at the top of the hierarchy or with higher importance scores are assigned greater weights, amplifying their influence on the model's predictions. This weighting mechanism ensures that the model prioritizes the most relevant features when generating email strategies, leading to more personalized and effective outputs.

In an embodiment, the model tuning module implements a gradient-based optimization algorithm, such as Adam or RMSprop, to efficiently update the model parameters. The gradients used in these updates are scaled according to the feature importance derived from the dynamic hierarchy, ensuring that parameter updates are proportional to each feature's significance. In a further embodiment, the model tuning module employs a cross-validation strategy to evaluate the impact of parameter adjustments. This involves partitioning the training data into subsets, allowing the system to assess the model's performance across different combinations of features and their respective importance levels. The results of this cross-validation process inform further refinements to the model parameters, ensuring robust performance across various data scenarios. In another embodiment, the model tuning module incorporates a feedback loop that continuously evaluates the performance of the fine-tuned model against predefined metrics such as engagement rates or conversion rates. If the performance falls below certain thresholds, the module may trigger a more comprehensive retraining process or adjust the feature hierarchy itself, ensuring that the model remains optimized for current data patterns and business objectives. By implementing these sophisticated fine-tuning mechanisms, the system ensures that the machine learning model remains highly adaptive and responsive to the dynamic nature of the feature hierarchy. This approach enables the generation of increasingly personalized and effective email strategies, as the model continuously optimizes its parameters to align with the most important and relevant features for each specific use case.

In an embodiment, the system may generate one or more email strategies by using the fine-tuned machine learning model. The one or more email strategies may be designed to guide the content and structure of the emails that will be sent to recipients. Each email strategy could include various elements such as tone, style, content, or specific messaging approaches. It may be noted that the system receives multiple data points about the recipient, but not all of them may be equally relevant to crafting the perfect email strategy. Identifying and selecting the most relevant data points is a crucial step. The system identifies which data points offer the most insight into the recipient's interests, needs, and behaviours.

In an embodiment, the system may generate one or more email strategies based on the fine-tuned model's recommendations. For example, the system may generate 3 email strategy for one recipient. Each email strategy may include one or more of content generation, tone recommendations, content structure, personalization elements, key themes, messaging approach, language style, optimal length of email, specific phrases or keywords, timing recommendations, follow up strategy, and the like. For example, 1. Content generation: the fine-tuned model may analyse the extracted features specific to each recipient, such as their job title, industry, recent activities, and historical engagement patterns. Based on this analysis, the model may generate multiple content variations for each email. These variations may include: a. different opening lines tailored to the recipient's role or recent company news. b. various value propositions aligned with the recipient's industry challenges. c. multiple calls-to-action customized to the recipient's decision-making authority. d. personalized examples or case studies relevant to the recipient's company size or sector. The model may generate these content elements with varying levels of detail, tone, and complexity, creating a diverse set of options for each email strategy.

2. Timing recommendations: the fine-tuned model may analyse temporal features such as the recipient's past engagement times, industry-specific trends, and the nature of the content to recommend optimal sending times. This may include: a. specific times of day for sending the email b. optimal days of the week for each recipient. c. recommendations for follow-up timing based on the initial email's content and urgency. d. suggestions for multi-touch campaigns with strategically timed sequences of emails. 3. format recommendations: based on the extracted features and their ranked importance, the fine-tuned model may suggest various format options for each email strategy. These recommendations may encompass: a. email length (e.g., short and concise vs. detailed and comprehensive). b. structure (e.g., problem-solution format, storytelling approach, or direct pitch). c. visual elements (e.g., inclusion of images, infographics, or videos). d. Mobile optimization strategies based on the recipient's device usage patterns. c. Accessibility considerations tailored to the recipient's known preferences or requirements The model may generate multiple format variations for each strategy, allowing for diverse testing and personalization options. 4. Tone recommendation: the model may suggest an appropriate tone for the email, such as formal, friendly, enthusiastic, or empathetic, based on the sentiment analysis and the recipient's past interactions. 5. Content structure: the model may propose a structure for the email, such as an attention-grabbing opening, key points to address, and a compelling call-to-action. 6. Personalization Elements: The model may identify specific details from the named entity recognition process to include in the email for personalization. 7. Key themes: based on the topic modelling results, the model may suggest primary themes or topics to focus on in the email content. 8. Messaging approach: the model may recommend a specific messaging approach, such as problem-solution, benefit-oriented, or storytelling, based on what has been effective with similar recipients or in similar contexts. 9. Language style: the model may suggest a particular language style, such as technical, conversational, or persuasive, based on the recipient's profile and past engagement. 10. Specific phrases or keywords: the model may suggest including certain phrases or keywords that have shown to resonate with the recipient or similar profiles. 11. Follow-up strategy: The model may propose a follow-up strategy, including timing and approach, based on the recipient's typical response patterns.

In an embodiment, for each recipient, the system may compile for example let's say personalized content, timing, and format recommendations into a set of distinct email strategies. Each strategy may represent a unique combination of these elements, optimized based on the feature importance hierarchy. For example:-Strategy A: Short, problem-focused email with a video testimonial, sent early morning on a Tuesday. Strategy B: Longer, story-driven email with industry-specific case studies, sent mid-afternoon on a Thursday. Strategy C: Concise, action-oriented email with a personalized offer, sent late morning on a Monday. The system may generate multiple strategies (e.g., 3-5) for each recipient, providing options for testing and refinement.

In an embodiment, the fine-tuned model may consider broader contextual factors when generating these strategies, such as: 1. Current market conditions or industry trends. 2. The recipient's position in the sales funnel or customer journey. 3. Recent interactions with the company's website or other marketing channels. 4. Seasonal factors or upcoming events relevant to the recipient's industry. This contextual adaptation may allow the generated strategies to be highly relevant and timely. Further, the system may determine the most appropriate strategy from the multiple strategies generated. The selection process typically hinges on identifying the strategy that is most likely to resonate with the recipient. To determine the best strategy, the system often takes into account various factors, including the recipient's preferences, behaviours, and characteristics. This selection process is critical in ensuring the success of the email outreach. In an embodiment, the system, having generated multiple email strategies based on the fine-tuned machine learning model's recommendations, selects the most suitable strategy based on various factors and techniques. The system may execute a strategy selection algorithm that scores and ranks the email strategies based on engagement potential, relevance, outreach appropriateness, and saliency, and automatically selects the highest-ranked strategy. For example, the selection scoring algorithm may assign scores to each generated email strategy across multiple dimensions: 1. Engagement Potential: this score may be calculated based on historical data and predictive modelling. The system may analyse past recipient behaviour, such as open rates, click-through rates, and response rates for similar content and strategies. Machine learning models trained on this historical data may predict the likelihood of engagement for each strategy. 2. Relevance: The relevance score may assess how well the strategy aligns with the recipient's current needs, interests, and pain points. This may involve analysing recent interactions with the company's website, content consumption patterns, and any known business challenges or goals of the recipient's organization. 3. Outreach Appropriateness: This dimension may evaluate how suitable the strategy is given the recipient's position, the current stage of the sales cycle, and the overall relationship with the company. Factors such as communication frequency, previous responses, and the nature of past interactions may be considered. 4. Saliency: The saliency score may measure how well the strategy stands out and captures attention. This may involve assessing the uniqueness of the content, the timeliness of the message, and its alignment with current trends or events relevant to the recipient.

In an embodiment, the selection scoring algorithm may employ a dynamic weighting system for these scoring dimensions. The weights may be adjusted based on one or more of 1. The current goals of the email campaign (e.g., brand awareness, lead generation, or direct sales), the recipient's position in the customer journey, Industry-specific best practices, Recent performance data from similar campaigns. In an embodiment after scoring, the selection scoring algorithm may rank the strategies using a composite score calculated by combining the weighted dimension scores. This ranking process may involve one or more steps like, Normalization of scores across dimensions to ensure fair comparison, application of any additional business rules or constraints (e.g., frequency caps, content diversity requirements), Consideration of A/B testing requirements to ensure a mix of proven and experimental strategies, and the like.

In an embodiment, the system via the algorithm may then automatically select the highest-ranked strategy for each recipient. This selection process may involve one or more steps like, confidence thresholds to ensure the selected strategy meets minimum quality standards, diversity checks to avoid overuse of similar strategies across the campaign, real-time adjustments based on the most recent engagement data. In an example, the selection algorithm may also consider contextual factors such as: time sensitivity of the message, coordination with other marketing channels or campaigns, any known upcoming events or milestones for the recipient's organization.

In an embodiment, the strategy selection algorithm may employ adaptive learning techniques to improve its decision-making over time. This may involve one or more steps like tracking the performance of selected strategies and updating selection criteria based on actual outcomes, identifying patterns in successful strategies across different recipient segments, adjusting scoring and ranking methods based on emerging trends or changes in recipient behaviour, and the like. In an embodiment, while the system automatically selects the highest-ranked strategy, it may also include an override mechanism allowing human marketers to review and adjust selections if needed. This may be particularly useful for high-priority accounts or sensitive communications. By implementing this strategy selection process, the system can optimize the choice of email strategy for each recipient, potentially maximizing engagement and effectiveness of the email campaign. The combination of multi-dimensional scoring, contextual awareness, and adaptive learning allows for a nuanced and dynamic approach to strategy selection that can evolve with changing recipient preferences and campaign objectives.

In an embodiment, the system is configured to determine if any inappropriate or offensive content is being generated by the fine tune model in the email strategies. In an embodiment, the system is configured to determine if any inappropriate or offensive content is being generated by the fine-tuned model in the email strategies. In an embodiment, the system may provide explicit instructions within the model's prompts to avoid generating inappropriate or offensive content. These instructions may include directives to maintain professionalism, avoid controversial topics, and adhere to business communication etiquette. In yet another embodiment, after generation, the system may employ a multi-step scanning process. For example, the system may maintain a regularly updated database of inappropriate or offensive terms, phrases, and expressions. Each generated email strategy may be scanned against this database. In another example, the system may utilize natural language processing (NLP) techniques to analyse the context in which certain words or phrases are used, as some terms may be inappropriate in certain contexts but not others. In yet another example, the system may apply sentiment analysis to detect overly negative, aggressive, or inflammatory tones that may be considered inappropriate in professional communication.

In an embodiment, the system may fine tune a machine learning model by training specifically to classify content as appropriate or inappropriate for business communication. This model may be regularly updated with new training data to stay current with evolving standards of professional conduct. In an embodiment, for industries with specific regulatory requirements (e.g., healthcare, finance), the system may incorporate industry-specific compliance checks to ensure that the generated content adheres to relevant regulations and guidelines. In yet another embodiment, the system may include a module to check for cultural sensitivity, ensuring that the generated content is appropriate across different cultural contexts, especially for international communication. In an embodiment, the system may use one or more algorithms to detect and flag potential biases in the generated content, including gender, racial, or other forms of bias that may be considered inappropriate or offensive. In an embodiment, the system may incorporate a feedback mechanism where users can report inappropriate content that may have slipped through the automated checks. This feedback may be used to continuously improve the detection algorithms and fine-tune the model. By implementing these multi-layered checks, the system can significantly reduce the risk of generating inappropriate or offensive content, ensuring that the email strategies remain professional, respectful, and aligned with business communication standards. This comprehensive approach not only safeguards against potential reputational risks but also enhances the overall quality and effectiveness of the generated email strategies.

In an embodiment, the system may generate one or more emails corresponding to the one or more selected email strategies. The one or more email may be generated by using at least one of a fine-tuned GPT model or any other AI model. The fine-tuned GPT model may be utilized to craft the email content, making use of their natural language generation capabilities and the insights gained from the email strategies. For example, the process of generating emails from selected strategies may comprise several steps: a) Input preparation: The system may convert the selected email strategy into a structured prompt suitable for the AI model. This structured prompt may include various components such as the approach (e.g., problem-solution, storytelling, direct pitch), industry focus, target role, key emphasis points, and desired tone. The system may also incorporate relevant recipient data, which may include, but is not limited to, the recipient's name, company, role, and recent interests or activities. Additionally, the system may include any specific requirements or constraints for the email, such as word limit, inclusion of case studies, or specific call-to-action instructions. b) Prompt engineering: The system may craft a detailed prompt that guides the AI model to generate content aligned with the strategy. This prompt may combine the structured strategy information, recipient data, and specific requirements into a comprehensive set of instructions for the model. The prompt may include directives on tone, structure, key points to cover, and any other relevant parameters derived from the email strategy. c) Email generation: The fine-tuned GPT model or other AI model may process the engineered prompt and generate email content. During this process, the model may leverage its training on successful emails and strategies to produce relevant, engaging text that aligns with the given strategy and meets the specified requirements. The model may draw upon its understanding of effective business communication, industry-specific language, and persuasive writing techniques to craft the email content. d) Post-processing: Following the initial generation, the system may review the generated content for adherence to the strategy and compliance with any specified requirements. This may involve automated checks for key elements, tone consistency, and alignment with the original strategy. The system may apply any necessary adjustments or formatting to ensure the email meets all criteria and is ready for potential human review or direct sending. The generated email may include various elements such as a personalized greeting, an opening that addresses the recipient's challenges or interests, a presentation of the solution or offer, supporting evidence (e.g., case studies, statistics), and a clear call-to-action. The specific content and structure of the email may vary based on the selected strategy and the AI model's interpretation of the prompt. This approach to email generation allows for the creation of highly personalized, strategy-aligned emails at scale, potentially improving the efficiency and effectiveness of email outreach campaigns.

In an embodiment, the system may implement a two-stage generation process: first, creating a detailed content outline based on the selected strategy, and then expanding this outline into full email content. This approach ensures that the generated emails maintain a coherent structure while allowing for creative and contextually appropriate language. Additionally, the system may incorporate a style transfer mechanism to adapt the generated content to match the sender's writing style or the company's brand voice.

In an embodiment, the system displays the email and the email strategies to a user. In an embodiment, the system may automatically highlight a few citations from the email. When a user hovers the cursor over a highlighted citation in the email, the system responds by displaying an associated email strategy. This interaction allows users to quickly access additional information about the strategy behind the highlighted content. The displayed email strategy provides insights into how that particular citation was generated. It clarifies which type of email strategy was used to create that specific content. This information allows the user to understand the reasoning and context behind the content, facilitating a deeper comprehension of the email's communication approach. It may be noted that the email strategy is generated based on the received data. When the user hovers the highlighted sentences in the email content, the user may access information about the specific training content snippets that influenced the generation of those sentences. In an embodiment, the user may also click on "View overall generation strategy" to view how the AI approached writing the email for the specific contact.

In an embodiment, the system may send the personalized email to the recipient of the campaign and monitor recipient interactions with the email in real-time. This process may involve one or more steps to capture, analyses, and utilize interaction data for continuous improvement of the email generation and strategy selection processes. For example, the system may initiate the email sending process through an automated email delivery module. This module may be configured to perform one or more steps. For example, the module may schedule the email delivery based on the optimal timing recommendations generated by the fine-tuned model. The module may implement email authentication protocols (e.g., SPF, DKIM, DMARC) to ensure deliverability. Further, the module may apply any last-minute personalization, such as dynamic content insertion based on the recipient's most recent activities. The module may manage email queues to prevent server overload and maintain consistent delivery rates.

In an embodiment, once the email is sent, the system may employ a real-time monitoring module to track recipient interactions. This module may capture various types of interaction data, including: 1. Email opens, including time of open and device type used, 2. Click-through events on links within the email. 3. Time spent reading the email and scroll depth. 4. Forwarding or sharing of the email. 5. Replies or responses to the email. 6. Unsubscribe actions or spam reports. The monitoring module may utilize techniques such as pixel tracking, link redirection, and email client API integrations to gather this data. The system may implement privacy-preserving measures to ensure compliance with data protection regulations. In an embodiment, as interaction data is collected, the system may process and analyse it in real-time. This process may involve one or more steps like data cleaning and normalization to ensure consistency across different email clients and devices. Aggregation of individual interaction events into meaningful metrics (e.g., engagement rate, click-to-open ratio). Contextual analysis to understand the circumstances of each interaction (e.g., time of day, device type, location). Sentiment analysis on email replies to gauge recipient reactions.

In an embodiment, the system may be configured to refine the dynamic feature hierarchy. The processed interaction data may be used to continuously refine the dynamic feature hierarchy. The process for refining the dynamic feature hierarchy includes one or more steps, for example, the system may update feature importance scores based on their correlation with positive interactions. The new features that emerge as significant predictors of engagement may be identified. The system may Adjust the relative rankings of features within the hierarchy. In an embodiment, the system may archive or deprioritize features that no longer demonstrate significant impact. The system may employ statistical techniques such as regression analysis or machine learning algorithms like gradient boosting to quantify the impact of each feature on email performance metrics. In an embodiment, the refined feature hierarchy and new interaction data may be used to further fine-tune the machine learning model. This ongoing fine-tuning process may involve one or more steps like 1. Incremental learning techniques to update the model without full retraining, allowing for rapid adaptation to new data. 2. Adjusting model parameters to give more weight to features that have demonstrated increased importance. 3. Expanding the model's training dataset with the most recent successful interactions, allowing it to learn from the latest effective strategies. 4. Implementing regularization techniques to prevent overfitting to recent data while maintaining adaptability.

In an embodiment, the system may establish a feedback loop that uses the refined feature hierarchy and fine-tuned model to inform subsequent email strategies. For example, the system may dynamically adjust content generation parameters based on successful interaction patterns. The system may refine timing recommendations to align with periods of high engagement. Further, the system may adapt format suggestions to favour layouts and structures that have demonstrated better performance. The system may update personalization algorithms to focus on the most impactful recipient-specific features. In an embodiment, the system may automatically generate A/B tests for subsequent emails based on insights from the interaction data. These tests may explore one or more of: variations in content elements that showed promising but inconclusive results, different timing strategies for recipients with similar profiles, and alternative formats or layouts inspired by high-performing emails. In an embodiment, the system may implement anomaly detection algorithms to identify unusual patterns in recipient interactions. This could trigger alerts for human review in cases of one or more: sudden changes in engagement rates for specific recipient segments, unexpected negative reactions or high unsubscribe rates, potential deliverability issues or technical problems affecting email rendering. By implementing this comprehensive approach to sending, monitoring, and learning from email interactions, the system can create a self-improving cycle of email strategy optimization. This continuous refinement of the dynamic feature hierarchy and fine-tuning of the machine learning model may lead to increasingly effective and personalized email campaigns over time, potentially resulting in higher engagement rates and improved overall campaign performance.

In one embodiment, the system may be configured to automatically generate and send replies to incoming emails received in response to the initial campaign emails. This feature enhances the efficiency of email communication by maintaining engagement without constant human intervention. The system may analyse the content of incoming replies using natural language processing techniques to categorize the responses and determine appropriate follow-up actions. For example. the system may identify responses as positive (showing interest), negative (declining further communication), or requiring additional information. For positive responses, the system may generate tailored follow-up emails that aim to move the conversation forward. These emails may include suggested meeting times, additional product information, or answers to frequently asked questions, all personalized based on the recipient's initial response and known data.

In an embodiment, in cases where the incoming email contains complex queries or requests that exceed the system's capability to respond accurately, the system may be configured to route the query to a human representative. This process may involve one or more steps like 1. Generating an internal notification email to a designated email address or team. 2. Including a summary of the conversation history and the specific query that requires human attention 3. Automatically sending a holding response to the original sender, acknowledging receipt of their email and informing them that a team member will be in touch shortly. For example, the system may generate an email stating: "Thank you for your inquiry. Our team member [Name] (copied on this email) will be best placed to assist you with your specific request and will reach out to you shortly."

In yet another embodiment, the system may also be configured to generate escalation protocols based on the urgency or importance of the incoming email. For instance, emails from high-value recipients or containing certain keywords may trigger immediate notification to sales representatives, ensuring timely human intervention when necessary. In an embodiment, the system may incorporate a feedback loop that utilizes responses to human-handled complex queries to further refine and improve its email strategy generation capabilities. This process may involve several sophisticated steps to capture, analyse, and integrate insights from these human-managed interactions. In an embodiment, when a designated human representative responds to a complex query, the system may capture and analyse the response, along with any subsequent interactions. For example, the system may be configured to utilise Natural Language Processing (NLP) techniques to extract key themes, sentiments, and content elements from the human representative's response. The system may identify new features or attributes that were not previously considered in the automated email generation process. The system may perform an analysis of the language style, tone, and structure used by the human representative to address the complex query effectively. Based on this analysis, the system may update the dynamic feature hierarchy in one or more steps like, 1. Introducing new features: If the human response introduces new elements or approaches not previously considered, these may be added to the feature set and initially assigned a moderate importance score. 2. Adjusting feature importance: The system may increase the importance scores of features that were prominently used or proved effective in the human response. 3. Creating new feature combinations: If the human response demonstrates effective use of multiple features in combination, the system may create new composite features to capture these interactions. 4. Deprioritizing fewer effective features: Features that were not utilized or proved less effective in addressing complex queries may have their importance scores reduced.

In an embodiment, following the updates to the dynamic feature hierarchy, the system may adjust the fine-tuned machine learning model to incorporate these new insights. This process may involve: one or more steps of 1. Incremental learning: The model may be updated using incremental learning techniques, allowing it to adapt to new information without requiring a full retraining process. 2. Transfer learning: Insights gained from human responses to complex queries may be transferred to improve the model's performance on simpler, more routine queries. 3. Attention mechanism adjustment: If the model uses attention mechanisms, these may be fine-tuned to focus more on features and patterns that proved effective in human responses. 4. Hyperparameter optimization: The model's hyperparameters may be adjusted to better align with the updated feature hierarchy and newly observed patterns in effective responses. The adjusted model may then be used to improve future email strategy generation in several ways like the model may become better equipped to generate strategies for addressing complex queries without immediate human intervention, by incorporating insights from human responses, the model may generate more nuanced and contextually appropriate email strategies, the model may learn to dynamically adapt content based on the complexity and nature of the query, mirroring the flexibility demonstrated in human responses, the improved model may become better at anticipating potential complex queries and pre-emptively incorporating relevant information into initial email strategies. This process of updating the dynamic feature hierarchy and adjusting the machine learning model based on human responses may operate as a continuous feedback loop. Each instance of human intervention may potentially contribute to the system's ongoing improvement. By implementing this comprehensive approach to learning from human responses to complex queries, the system may continuously enhance its ability to generate effective email strategies. This may lead to a reduction in the need for human intervention over time, while maintaining high-quality, personalized communication even in complex scenarios. The synergy between AI-driven automation and human expertise may result in an increasingly sophisticated and adaptive email communication system.

Figure 2A:
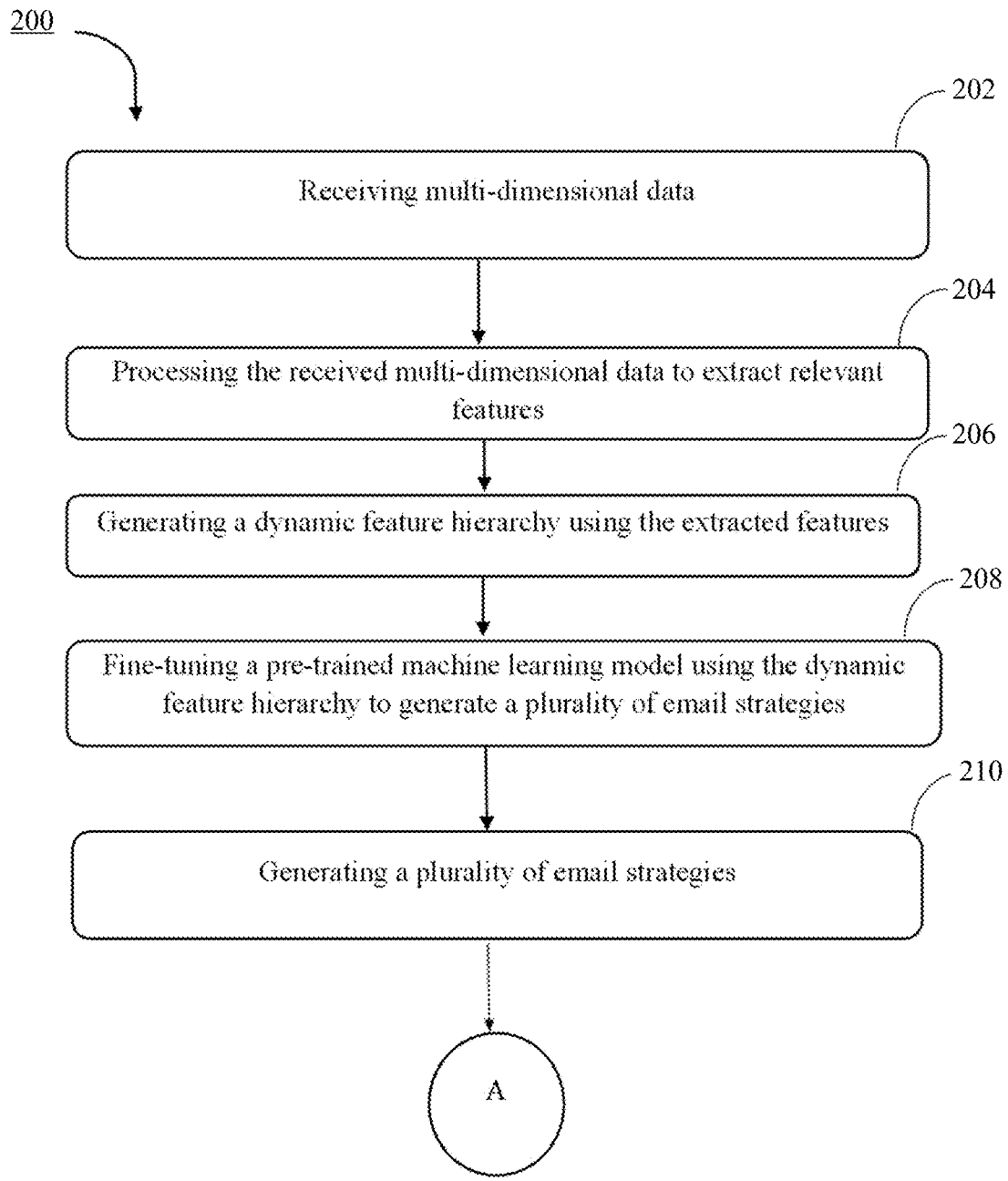
FIGS. 2A and 2B illustrate a method for generating a plurality of personalized email strategies and a corresponding personalized email, in accordance with an embodiment of the present subject matter.
Figure 2B:
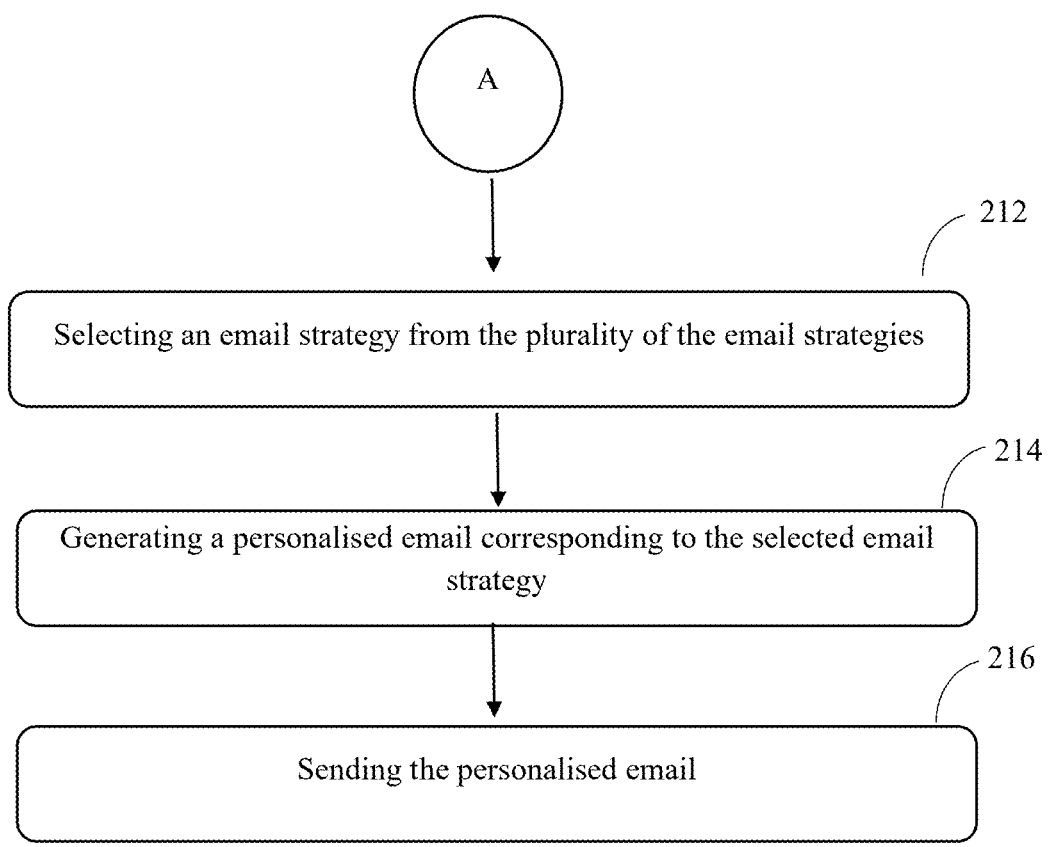

Referring now to FIG. 2, a method 200 for automatically generating an email and associated email strategy based on recipient data is shown, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method blocks can be combined in any order to implement the method 200 or alternate methods for automatically generating an email and associated email strategy based on recipient data. Additionally, individual blocks may be deleted from the method 200 without departing from the scope of the subject matter described herein. Furthermore, the method 200 for automatically generating an email and associated email strategy can be implemented in any suitable hardware, software, firmware, or combination thereof. However, for ease of explanation, in the embodiments described below, the method 200 may be considered to be implemented in the above-described system 102.

At block 202, data comprising seller data, recipient data, and account data may be received.

At block 204, a the received multi-dimensional data may be processed to extract relevant features. At block 206, a dynamic feature hierarchy using the extracted features may be generated.

At block 208, a pre-trained machine learning model may be fine-tuned using the dynamic feature hierarchy to generate a plurality of email strategies.

At block 210, a plurality of email strategies for each of the recipient of the campaign by applying the fine-tuned model's recommendation, may be generated.

At block 212, an email strategy from the plurality of the email strategies based on one or more factors may be selected.

At block 214, a personalized email corresponding to the selected email strategy may be generated.

At block 216, the personalized email and the selected email strategy to generate the personalized email may be sent to a recipient.

Figure 3:
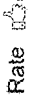
FIG. 3 illustrates an example of a graphical user interface for generating a plurality of personalized email strategies and a corresponding personalized email, in accordance with an embodiment of the present subject matter.

Referring to FIG. 3, an example of a graphical user interface for automatically generating an email and associated email strategy is shown. The GUI shows an email that is created automatically by using the fine-tuned GPT model. Further, the generated email is personalized, and the email is generated based on the email strategy. The bottom right part (referred hereinafter as dialogue box) of the image displays an email strategy used for generating the email. The dialogue box also displays the recipient's profile data.

Figure 4:
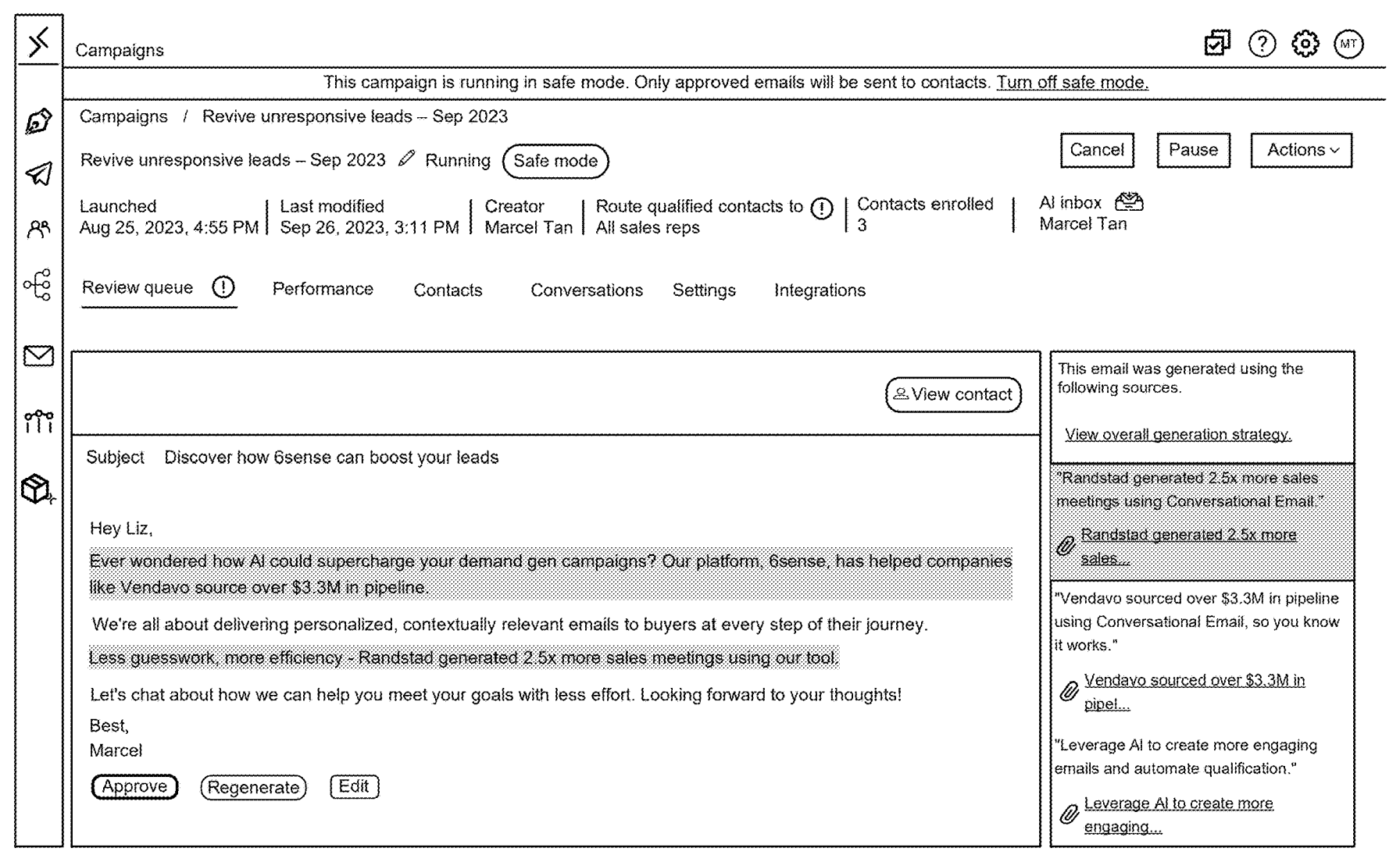

FIG. 4 illustrates another example of a graphical user interface representing email strategies associated with specific citations from emails. The system has automatically highlighted a few citations from the email. When a user hovers the cursor over a highlighted citation in the email, the system responds by displaying an associated email strategy. This interaction allows users to quickly access additional information about the strategy behind the highlighted content. The displayed email strategy provides insights into how that particular citation was generated. It clarifies which type of email strategy was used to create that specific content. This information allows the user to understand the reasoning and context behind the content, facilitating a deeper comprehension of the email's communication approach. It may be noted that the email strategy is generated based on the received data. When the user hovers the highlighted sentences in the email content, the user may access information about the specific training content snippets that influenced the generation of those sentences. In an embodiment, the user may also click on "View overall generation strategy" to view how the AI approached writing the email for the specific contact.

Figure 5:
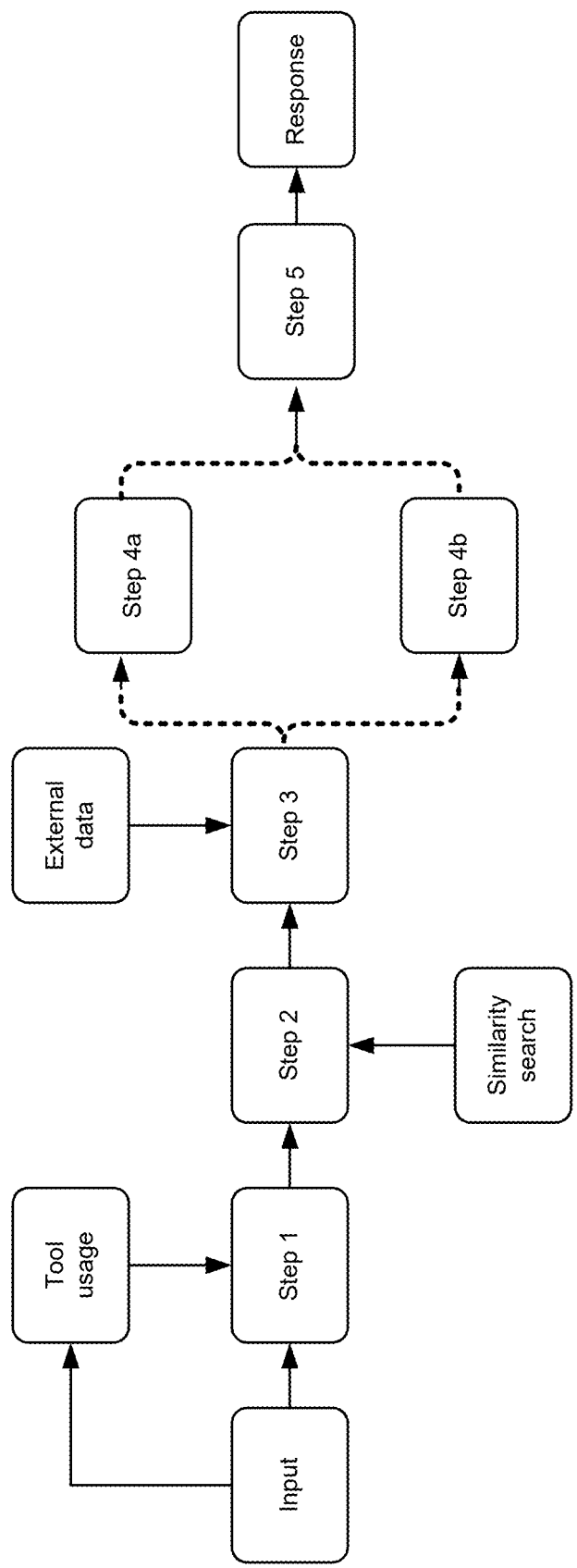
FIG. 5 illustrates a flowchart for sending instructions to a Large Language Model (LLM), in accordance with an embodiment of the present subject matter.

FIG. 5 illustrates a flowchart for sending instructions to a Large Language Model (LLM). FIG. 5 displays a workflow for compartmentalization for sending instructions to a Large Language Model. The compartmentalization means breaking down complex tasks or prompts into smaller, manageable workflows with intermediate reasoning steps. This approach offers several advantages, including enhanced output reliability and improved reasoning, especially when external dependencies are introduced at specific stages.

Compartmentalization may involve creating distinct, self-contained reasoning steps or compartments within a task. Each step maybe individually checked for accuracy and reliability. This increases the likelihood of producing reliable and accurate outputs because errors or inconsistencies can be identified and addressed at the intermediate level rather than waiting until the final output.

The intermediate reasoning steps in compartmentalization may include checks and guardrails. These measures help ensure that the reasoning process remains on track and aligned with desired outcomes. Self-reflection and self-consistency checks can be integrated into each compartment to further enhance output quality.

When a task involves external dependencies, compartmentalization allows these dependencies to be introduced only in specific steps where they are relevant. This minimizes the complexity and potential risks associated with external factors, making it easier to control and manage them.

Breaking down complex tasks into workflows with intermediate reasoning steps streamlines the overall task management process. It allows for parallel processing and simplifies the troubleshooting of any issues that may arise during the reasoning process.

Compartmentalization promotes a modular approach to task execution. This means that individual compartments can be adjusted or improved independently without affecting the entire task, contributing to greater flexibility and adaptability.

Figure 6D:
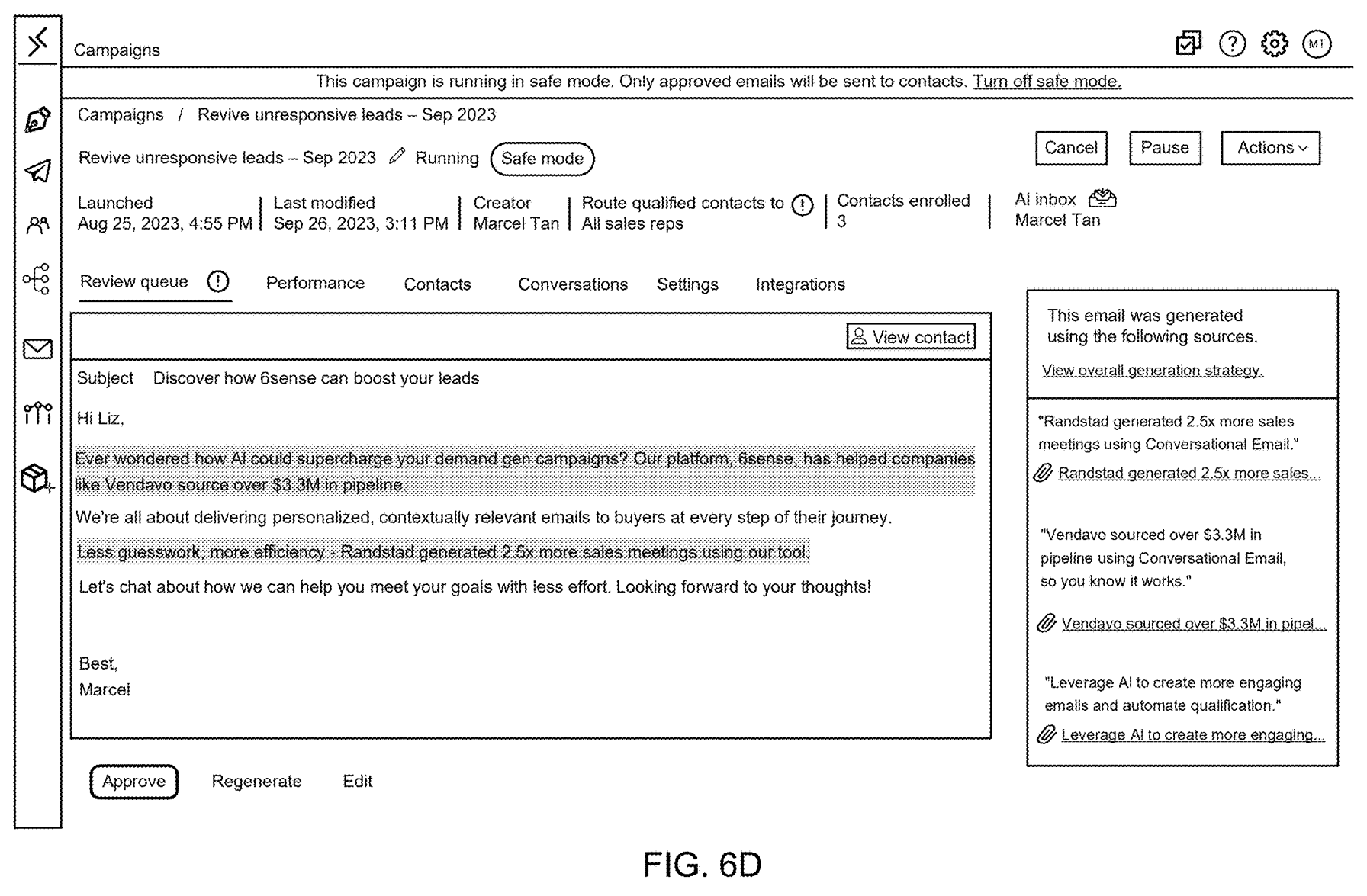

FIGS. 6A, 6B, 6C, and 6D illustrates an example of a graphical user interface for setting up the hyper-personalization FIG. 6A illustrates a graphical user interface for creating a new campaign from the Campaigns page. The user may click "Enable hyper-personalization" in the Conversational Email campaign launcher. This interface serves as the launchpad for initiating highly targeted campaigns, including specialized campaigns like "Awakening the Dead"-designed to re-engage recipients who have been unresponsive to previous communications. The "Enable hyper-personalization" option activates sophisticated AI-driven personalization features, allowing the system to craft uniquely tailored messages for each recipient, even in large-scale campaigns targeting hundreds or thousands of contacts.

FIG. 6B illustrates a graphical user interface for selecting a Playbook. For an "Awakening the Dead" campaign, the system may offer specialized Playbooks designed to re-engage dormant contacts. These Playbooks might include strategies like "Value Reminder," "New Offering Introduction," or "Personalized Pain Point Addressing." Each Playbook can be customized to align with the specific reasons for recipient disengagement, such as lack of perceived value, changed priorities, or missed communications. The interface allows users to select and fine-tune these strategies for maximum impact across a large recipient base.

FIG. 6C illustrates a graphical user interface for uploading training content. The step is optional but often recommended for effective emails and strategies. The user may upload training content such as case studies, product overviews, blog posts to create personalized emails that truly resonate with the recipients. For large-scale campaigns like "Awakening the Dead," this feature becomes crucial. Users can upload a diverse range of content that the system can draw upon to create highly personalized emails at scale. For instance, users might upload industry-specific success stories, recent product updates, or market trend analyses. The system can then intelligently match this content to individual recipients based on their profiles and past interactions, ensuring that each of the 500 or more emails in the campaign feels uniquely relevant to its recipient.

FIG. 6D illustrates a graphical user interface for launching the campaign in safe mode. The safe mode allows the user to approve, regenerate, and edit introduction emails before sending them to contacts. In the context of a large-scale "Awakening the Dead" campaign, this interface becomes a powerful tool for managing and refining hundreds of personalized emails. The system might present a summary dashboard showing key metrics across all generated emails, such as personalization scores, predicted engagement rates, and content diversity. Users can then drill down into individual emails or groups of similar emails for review and editing. The interface may also offer batch editing features, allowing users to make global changes across multiple emails while maintaining individual personalization. For example, if a user notices a common theme that could be improved across several emails, they can apply a change to all relevant emails simultaneously, streamlining the review process for large campaigns. This combination of automation and human oversight ensures that even in campaigns targeting 500 or more recipients, each email maintains a high standard of quality and personalization, maximizing the chances of re-engaging previously unresponsive contacts.

Exemplary embodiments discussed above may provide certain advantages. Though not required to practice aspects of the disclosure, these advantages may include those provided by the following features.

Some embodiments of the system and the method enable efficient and personalized recipient or user engagement.

Some embodiments of the system and the method automates the generation of emails and associated email strategies and thus, reducing human effort and time.

Although implementations for methods and system for generating an email and associated email strategy have been described in language specific to structural features and/or methods, it is to be understood that the appended claims are not necessarily limited to the specific features or methods described. Rather, the specific features and methods are disclosed as examples of implementations for generating an email and associated email strategy.

The invention claimed is:

1. A method for fine tuning a machine learning model, the method being executed by a processor:

receiving multi-dimensional data comprising account data, recipient data, and seller data from one or more data sources;

processing the received multi-dimensional data via a processing module executed by the processor to extract one or more features;

generating a dynamic feature hierarchy based on the one or more extracted features by executing a feature ranking module, wherein generating the dynamic feature hierarchy comprises:

evaluating the one or more extracted features by computing correlation coefficients, using a correlation analysis algorithm, between the one or more extracted features and a desired outcome;

assigning feature importance score to each of the one or more extracted features based on the computed correlation coefficients; and generating the dynamic feature hierarchy based on the assigned feature importance score;

updating the dynamic feature hierarchy by updating the feature importance score of the one or more extracted features based on at least: dynamic nature of email campaigns, data collected from previously transmitted emails, and changing recipient behaviours, wherein the updates are executed automatically by the processor via a feedback loop module;

fine-tuning a pre-trained machine learning model using the dynamic feature hierarchy, wherein the fine-tuning is performed, by a model tuning module, based on the feature importance score of the one or more features in the dynamic feature hierarchy, wherein the model tuning module uses an iterative approach to adjust learning rates of the machine learning model by dynamically increasing a learning rate for the one or more extracted features with higher feature importance scores and decreasing the learning rate for the one or more extracted features with lower feature importance scores;

generating one or more email strategies for a recipient by using the fine-tuned machine learning model, wherein the fine-tuned machine learning model is used to generate one or more of personalized content, timing, and format recommendations for the one or more email strategies;

selecting an email strategy from the one or more email strategies by executing a strategy selection algorithm that scores and ranks the one or more email strategies based on one or more factors including engagement potential, relevance, outreach appropriateness, and saliency;

generating a personalised email corresponding to the selected email strategy;

sending the personalized email to the recipient;

monitoring, in real time, to track the recipient interactions with the sent personalized email;

receiving, based on the monitoring the recipient interactions, interaction data, wherein the interaction data includes at least one of: email open, click through events on links within the personalised email, and time spent on the personalised email; and continuously refining the dynamic feature hierarchy based on the received interaction data and fine-tuning the pre-trained machine learning model based on the refined dynamic feature hierarchy.

2. The method of claim 1, further comprising:

receiving a reply to the sent personalized email;

analysing content of the received reply using natural language processing techniques to determine if the received reply comprises a complex query; and in response to determining that the received reply comprises the complex query, automatically routing the complex query to a designated human representative.

3. The method of claim 2 further comprising:

updating the dynamic feature hierarchy based on a response to the complex query by the designated human representative; and adjusting the fine-tuned pre-trained machine learning model based on the updated dynamic feature hierarchy to improve future email strategy generation.

4. The method of claim 1 wherein extracting the one or more features from the multi-dimensional data comprises:

analyzing engagement metrics, including email open rates, click-through rates, and purchase behaviour.

5. The method of claim 1, further comprising:

evaluating the generated one or more plurality of email strategies to determine if offensive content is present.

6. The method of claim 1, further comprising displaying on a graphical user interface, the generated personalized email and the selected email strategy.

7. The method of claim 6, wherein the graphical user interface highlights one or more citations in the displayed personalized email and displays the selected email strategy when a user hovers a cursor over a highlighted citation.

8. A system for fine tuning a machine learning model, the system comprising:

a memory storing one or more instructions;

a processor communicatively coupled with the memory, wherein upon execution of the stored instructions in the memory, the processor is configured to:

receive multi-dimensional data comprising account data, recipient data, and seller data from one or more data sources;

process the received multi-dimensional data via a processing module executed by the processor to extract one or more features;

generate a dynamic feature hierarchy based on the one or more extracted features by executing a feature ranking module, wherein generating the dynamic feature hierarchy comprises:

evaluate the one or more extracted features by computing correlation coefficients, using a correlation analysis algorithm, between the one or more extracted features and a desired outcome, and storing correlation values in a system memory;

assign feature importance scores to the one or more extracted features based on the computed correlation coefficients; and generating the dynamic feature hierarchy based on the assigned feature importance score;

update the dynamic feature hierarchy by updating the feature importance score of the one or more extracted features based on at least:

dynamic nature of email campaigns, data collected from previously transmitted emails, and changing recipient behaviours, wherein the updates are executed automatically by the processor via a feedback loop module;

fine-tune a pre-trained machine learning model using the dynamic feature hierarchy, wherein the fine-tuning is performed, by a model tuning module, based on the feature importance score of the one or more features in the dynamic feature hierarchy, wherein the model tuning module uses an iterative approach to adjust learning rates of the machine learning model by dynamically increasing a learning rate for the one or more extracted features with higher importance scores and decreasing the learning rate for the one or more extracted features with lower importance scores;

generate one or more email strategies for a recipient by using the fine-tuned machine learning model, wherein the fine-tuned machine learning model is used to generate one or more of personalized content, timing, and format recommendations for the one or more email strategies;

select an email strategy from the one or more email strategies by executing a strategy selection algorithm that scores and ranks the one or more email strategies based on one or more factors including engagement potential, relevance, outreach appropriateness, and saliency;

generate a personalised email corresponding to the selected email strategy;

send the personalized email to the recipient;

monitor, in real time, to track the recipient interactions with the sent personalized email;

receiving, based on the monitoring the recipient interactions, interaction data, wherein the interaction data includes at least one of: email open, click through events on links within the personalised email, and time spent on the personalised email; and continuously refining the dynamic feature hierarchy based on the received interaction data and fine-tuning the pre-trained machine learning model based on the refined dynamic feature hierarchy.

9. The system of claim 8, where in the processor is further configured to:

receive a reply to the sent personalized email;

analyse content of the received reply using natural language processing techniques to determine if the received reply comprises a complex query; and in response to determine that the received reply comprises the complex query, automatically routing the complex query to a designated human representative.

10. The system of claim 9, wherein the processor is further configured to:

update the dynamic feature hierarchy based on a response to the complex query by the designated human representative; and adjust the fine-tuned pre-trained machine learning model based on the updated dynamic feature hierarchy to improve future email strategy generation.

11. The system of claim 8 wherein extracting the one or more features from the multi-dimensional data comprises:

analyze engagement metrics, including email open rates, click-through rates, and purchase behaviour.

12. The system of claim 8, wherein the processor is further configured to:

evaluate the generated one or more email strategies to determine if offensive content is present.

13. The system of claim 8, wherein the processor is further configured to display on a graphical user interface, the generated personalized email and the selected email strategy.

14. The system of claim 13, wherein the graphical user interface highlights one or more citations in the displayed personalized email and displays the selected email strategy when a user hovers a cursor over a highlighted citation.

* * * * *